Aug. 22, 1967     F. Z. GOOSMAN     3,336,957
AUTOMATIC DRINK DISPENSER
Filed April 12, 1965     8 Sheets-Sheet 7
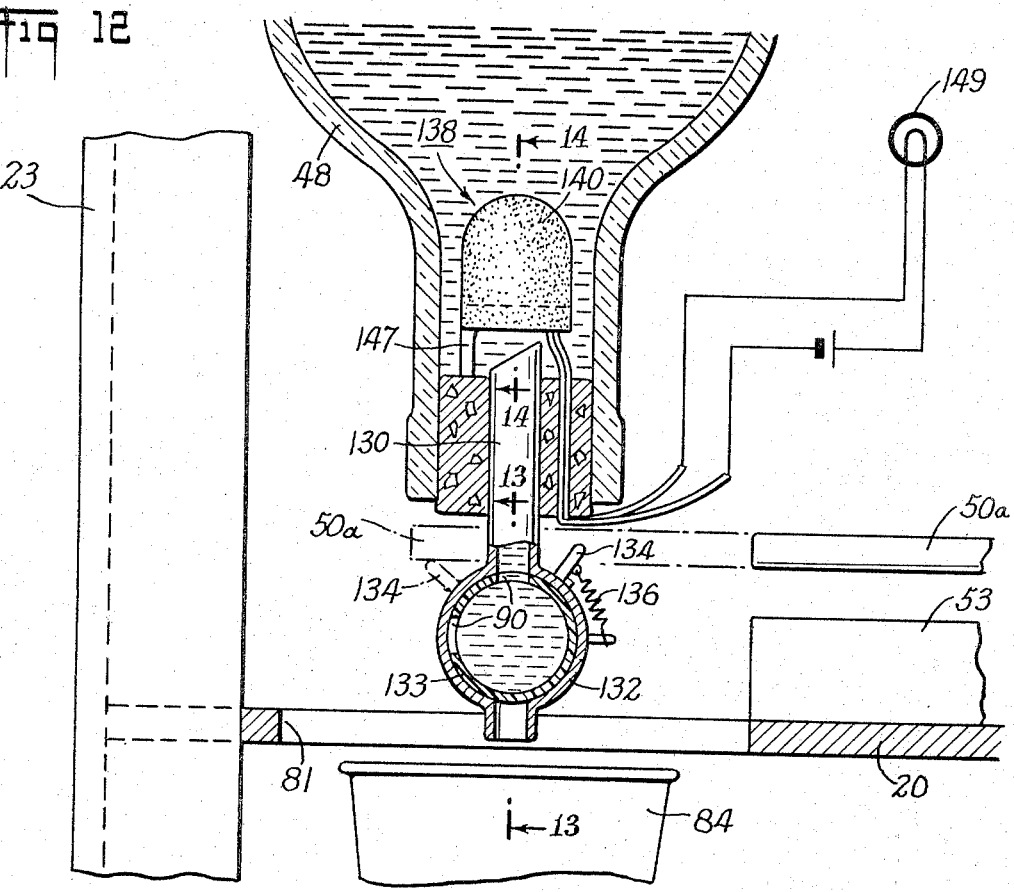
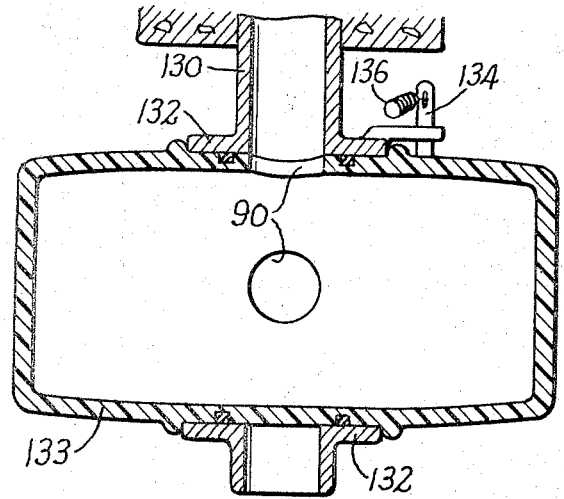
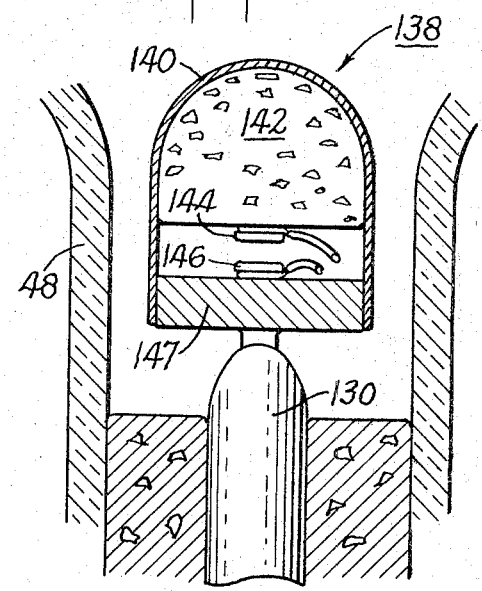

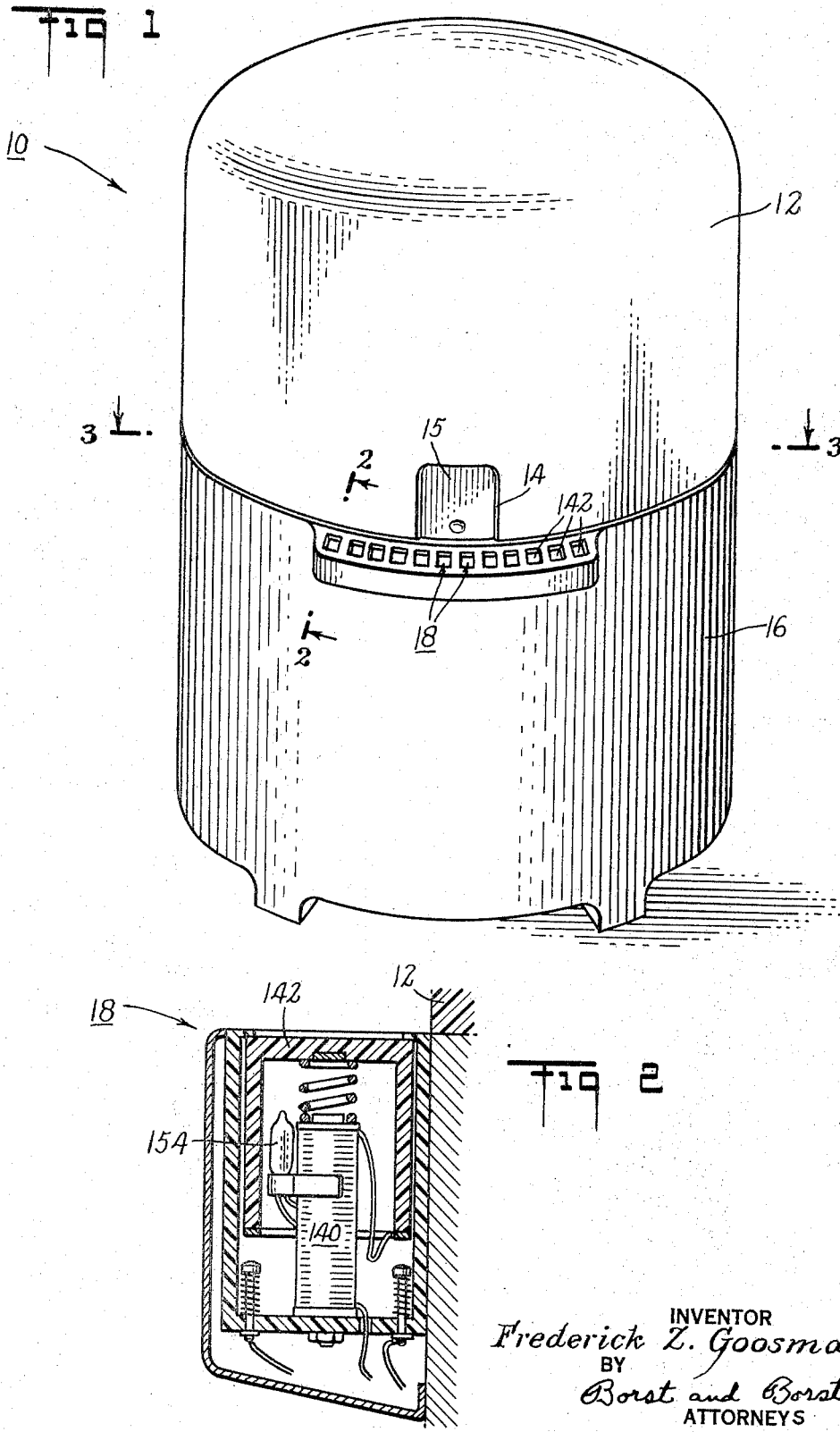

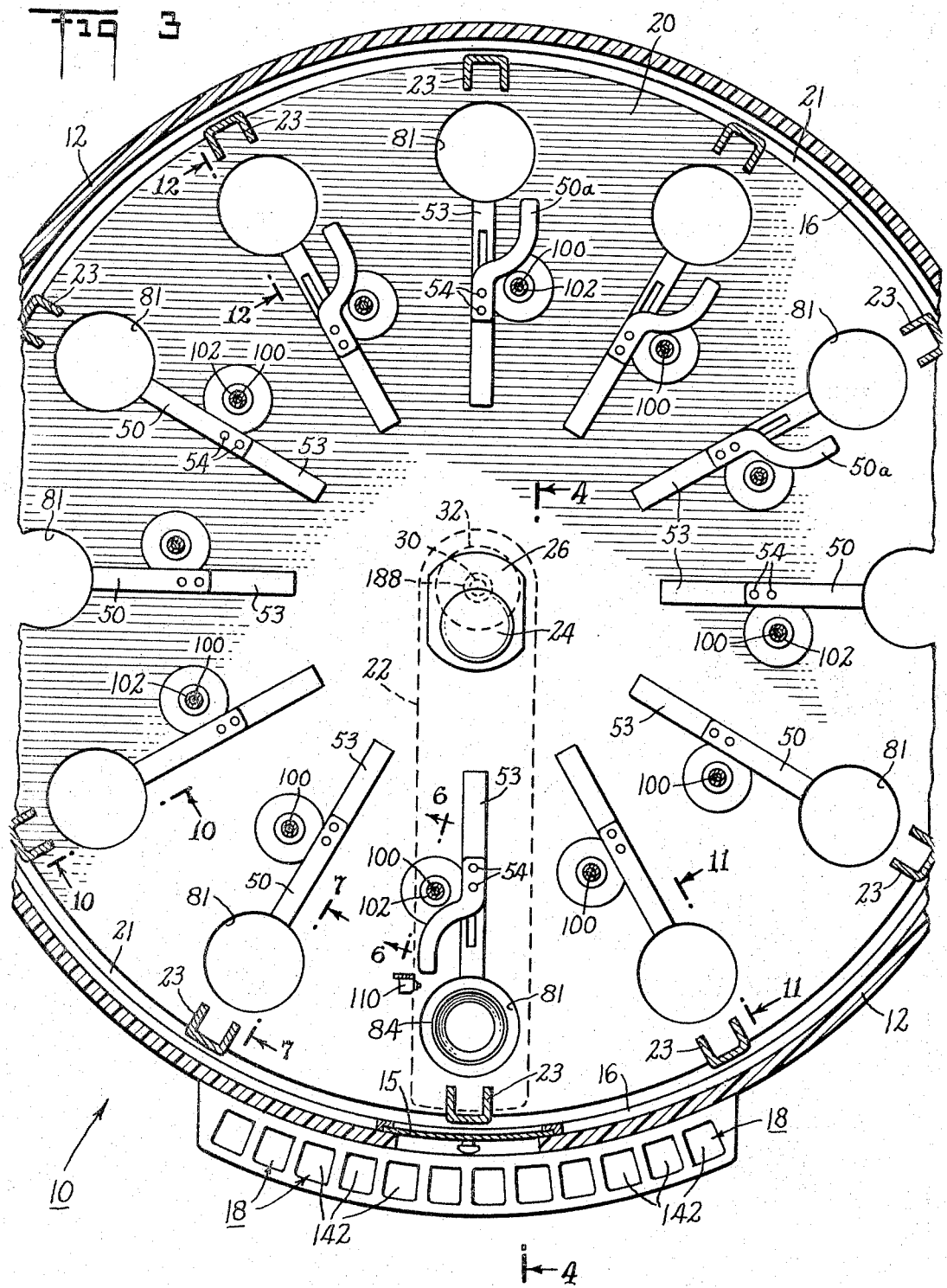

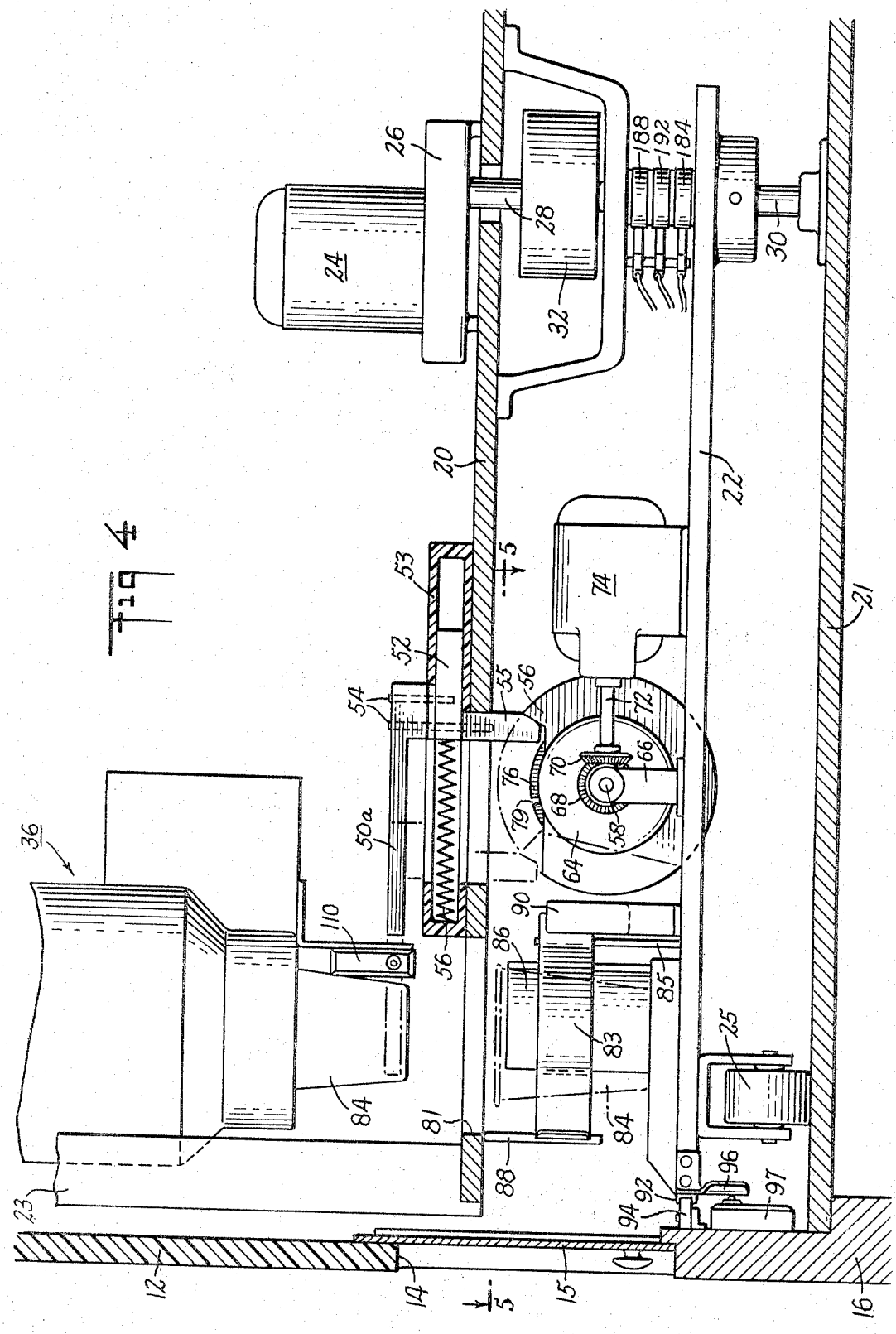

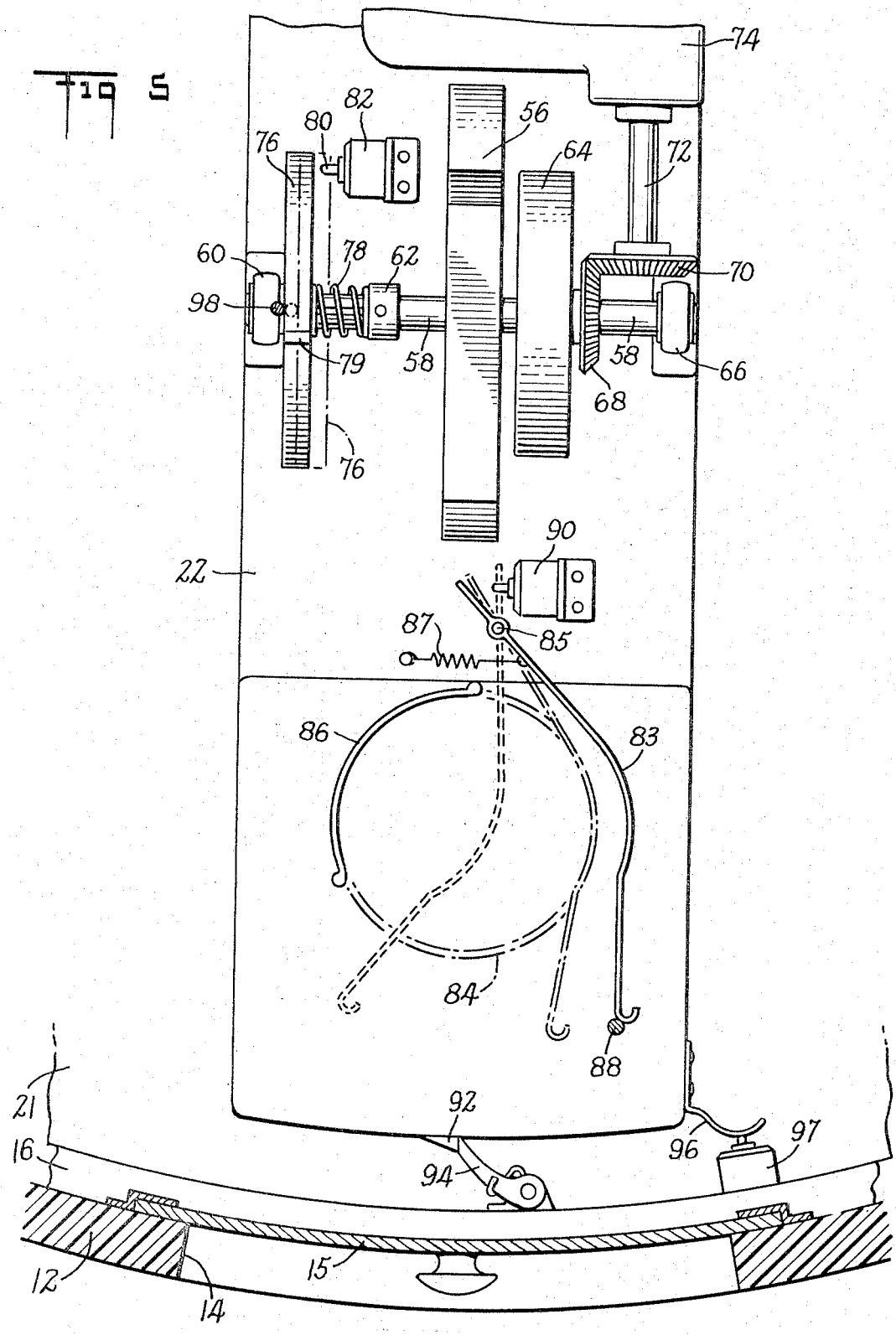

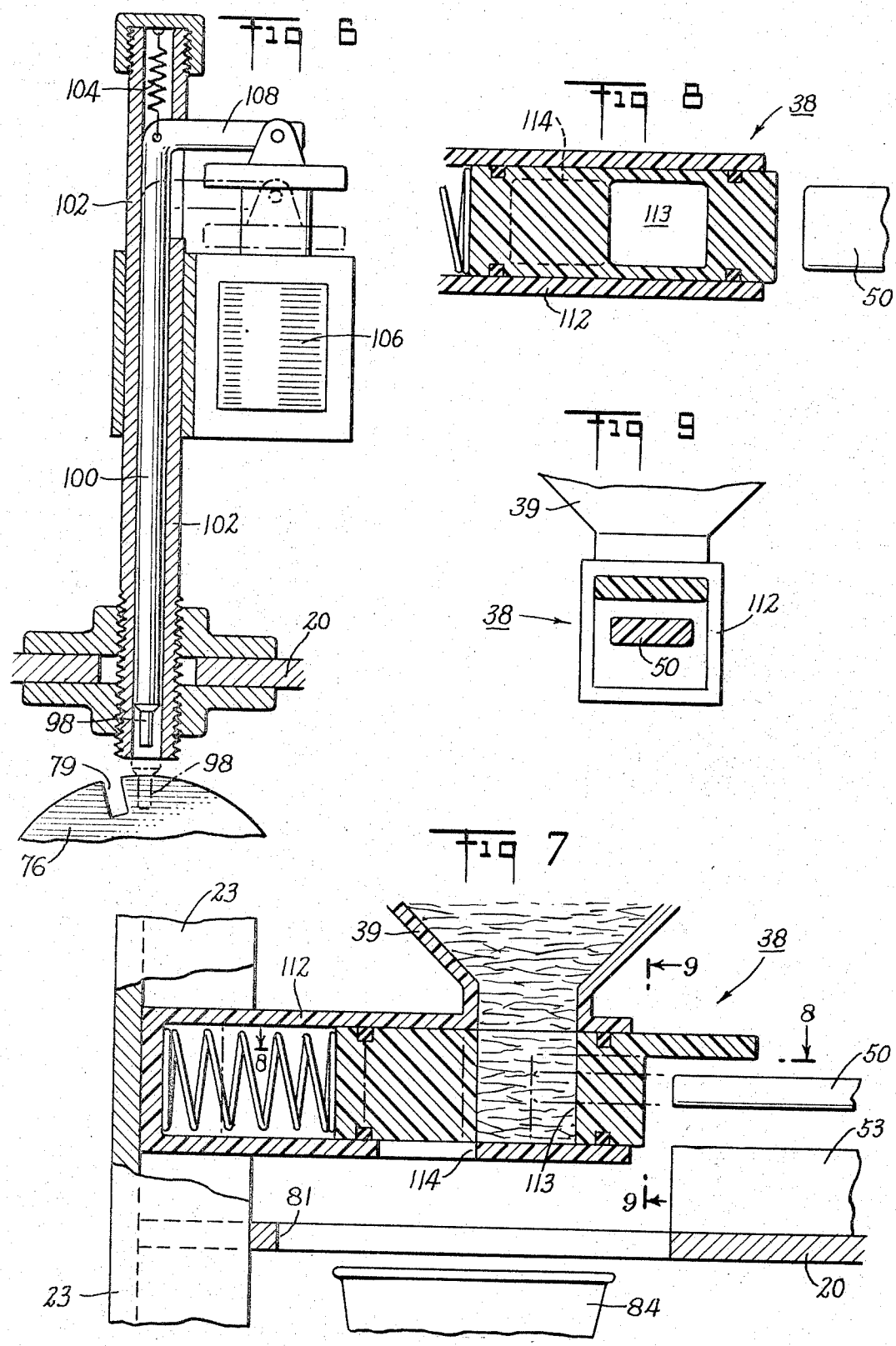

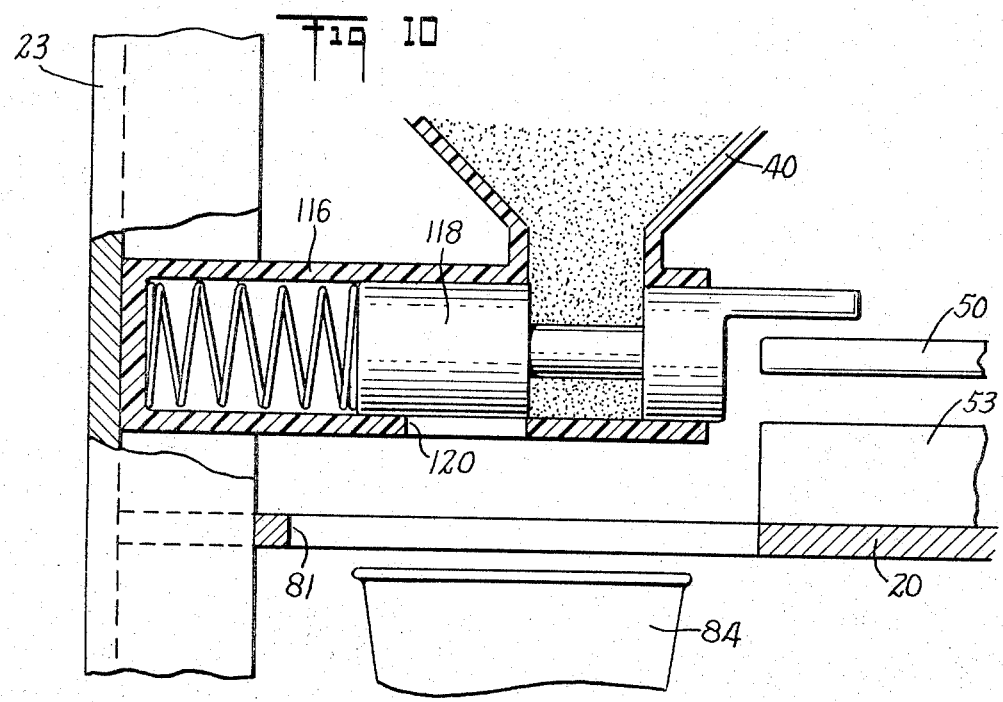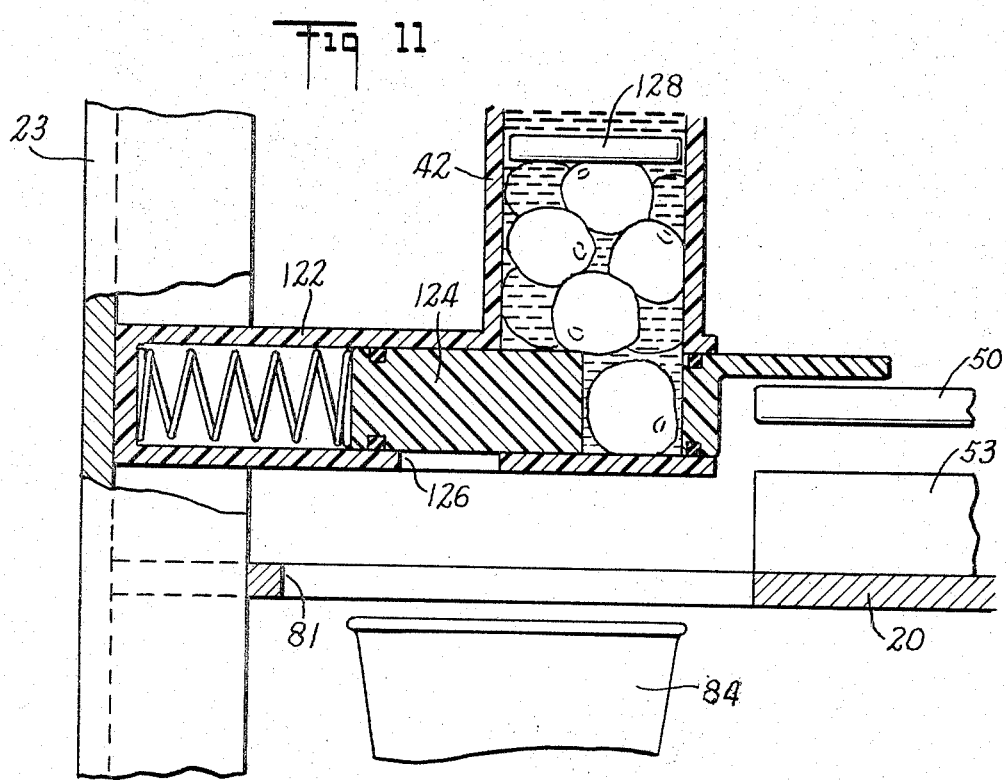

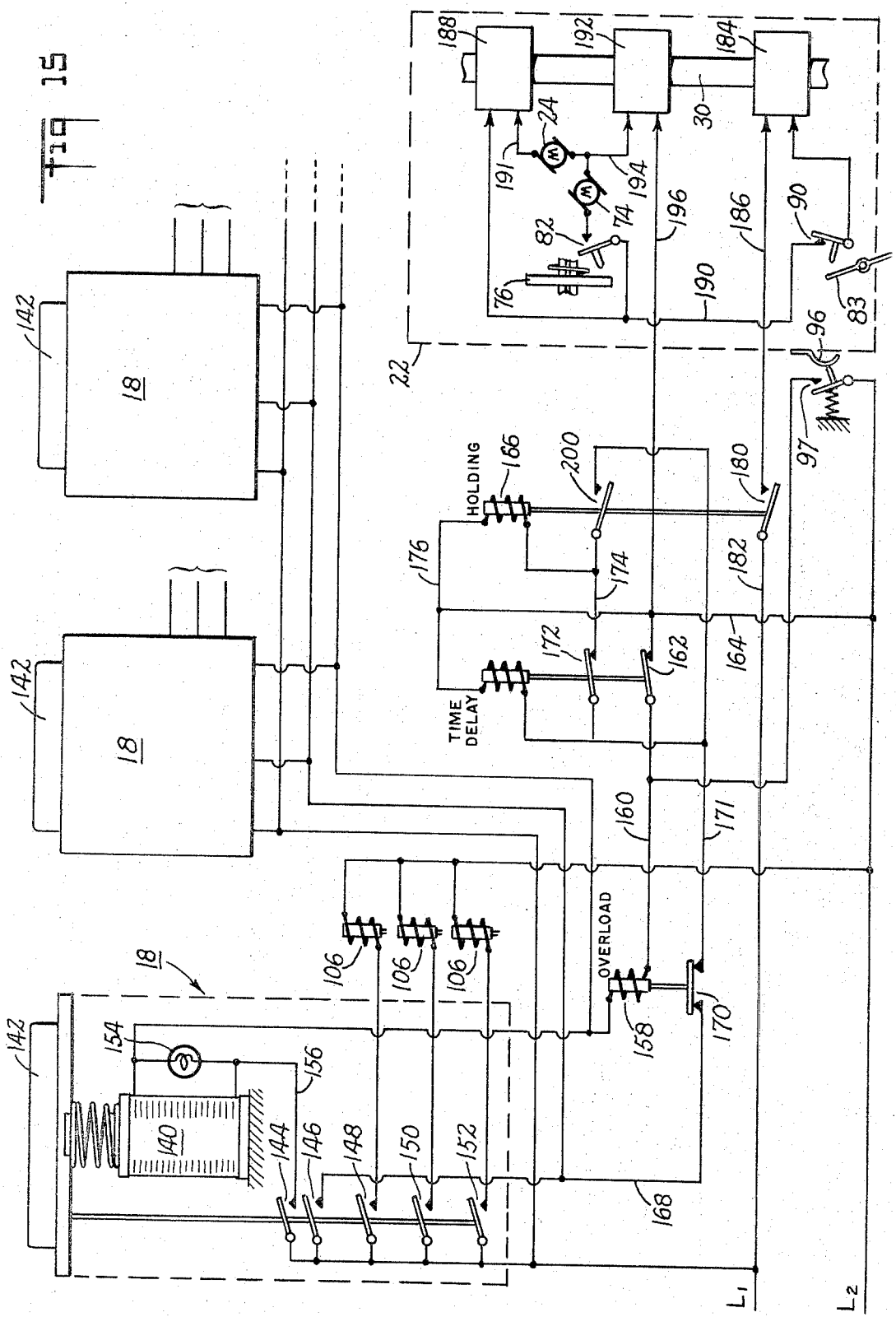

United States Patent Office 3,336,957
Patented Aug. 22, 1967

3,336,957
AUTOMATIC DRINK DISPENSER
Frederick Z. Goosman, 200 E. 57th St.,
New York, N.Y. 10022
Filed Apr. 12, 1965, Ser. No. 447,296
7 Claims. (Cl. 141—141)

ABSTRACT OF THE DISCLOSURE

An automatic drink dispenser having a cup arm which is rotated to the vicinity of a plurality of drink ingredient dispensers, there being associated with each dispenser a piston which is selectively operated according to the desired drink ingredient, said arm also having a retractable disc adapted to engage said pistons and thereby close a circuit to turn a motor driven cam for opening the selected dispensers.

This invention relates to automated devices for dispensing food and drink and in particular apparatus which is mechanized to perform a series of sequential functions relating to the preparation and dispensing of a beverage.

One object of the invention is to provide a new and improved device for preparing and dispensing a mixed drink.

Another object of the invention is to provide a drink mixing apparatus having an inherent capacity selectively and automatically to formulate and prepare mixed ingredient beverages.

In general the invention comprises a motor driven member supporting a beverage cup and automatic selection devices which are adapted on command to move the member and cup to various stations in relation to a fixed member where there are located the preselected ingredients required according to the formulation of the mixed drink which is desired. At each of these stations the selected devices operate in conjunction with activating elements on the fixed member to dispense the selected ingredient in measured amount. The apparatus is sufficiently selective that the user may choose certain secondary ingredients depending on his taste such as ice, olives and onions, fruit slices etc. Additionally certain safety features are incorporated in the apparatus in anticipation of certain faults in the mechanical operation and abuse by the user.

Other objects and advantages of the invention may be appreciated on reading the following description of one embodiment thereof taken in conjunction with the accompanying drawings, in which:

FIG. 1 is a perspective view of the drink mixing apparatus and casing therefor;

FIG. 2 is a section taken on line 2—2 of FIG. 1 showing a selector button;

FIG. 3 is a plan section taken on the line 3—3 of FIG. 1;

FIG. 4 is a section in elevation taken on the line 4—4 of FIG. 3 showing the principal mechanical elements of the automatic drink mixing apparatus;

FIG. 5 is a view of the cup retainer and the cam actuating components taken on the line 5—5 of FIG. 4;

FIG. 6 is a section taken on the line 6—6 of FIG. 3 showing the solenoid driven piston adapted to initiate the dispensing of beverage ingredients;

FIG. 7 is a section taken on line 7—7 of FIG. 3 showing the ice dispenser;

FIGS. 8 and 9 are sections taken on lines 8—8; 9—9; respectively, of FIG. 7 showing details of the ice dispenser;

FIGS. 10, 11 and 12 are sections taken on lines 10—10; 11—11; 12—12; respectively, of FIG. 3 illustrating various other forms of drink ingredient dispensers;

FIGS. 13 and 14 are sections taken on lines 13—13; 14—14; respectively, of FIG. 12 showing details of the liquid measure dispenser;

FIG. 15 is a schematic wiring diagram showing the circuit used in the cycling operation of the apparatus.

Referring to the drawings a perspective view of the automatic dispenser is shown in FIG. 1, the device being enclosed in a casing 10 which provides a removable top 12 with a port 14 through which the mixed beverage is removed on opening its hinged cover 15 and a base section 16 in which drink selector buttons 18 are accessibly disposed.

The drink selecting and mixing mechanism, FIG. 4, is housed within the casing and includes as its principal supporting members a fixed platform 20, rigidly attached to and spaced from the main supporting frame plate 21 by channels 23. A rotatable arm 22 is pivotally supported and driven by main gear motor 24 which drives the arm 22 in rotation, approximately midway between the platform and main frame plate 21, by means of gearing 26, vertical shaft 28 and shaft 30 connected to the former through slip clutch 32. To maintain the rotatable arm 22 in spaced relationship between the platform 20 and frame plate 21, the free end of the arm 22 is supported on roller 25 and rest on frame plate 21.

The platform 20 supports on its outer periphery the containers and bottles for the various ingredients normally employed in the mixing of cocktails and other kinds of mixed drinks. In the preferred embodiment of invention the various bottles and containers retain cups, ice, flavoring powder, fruit and onions, and alcoholic beverage for automatic dispensing. To this end there is provided a cup dispenser 36, FIG. 4; ice dispenser 38, ice container 39, FIG. 7; powder container 40, FIG. 10; olive, cherry, or onion jar 42, FIG. 11; and whiskey and wine bottles 48, FIG. 12. The containers are actuated in each instance by pusher elements 50 and 50a which is directed against a member adapted to release or dispense the active ingredient of the selected mixed drink. As seen in FIG. 4, the element 50a is secured to piston 52 within cylinder 53 by pins 54 extending through a slot in the cylinder. The pin extends through the piston and cylinder beneath the platform terminating in pusher element 55. Within the cylinder 53 the piston is biased by spring 56 to one end thereof.

The element 55 is engaged by cam 56, FIGS. 4 and 5, on shaft 58 journalled in bearings 60 and 66. The shaft 58 is driven through bevelled gears 68 and 70 and armature shaft 72 by gear motor 74.

There is also mounted on the shaft 58 a disc 76 biased against the bearing 60 by spring 78 which is also arranged on the shaft between the collar 62 and the disc 76. The disc 76 has an escape slot 79 and is adapted to engage in retracted position the contact 80 of microswitch 82 which serves to start the motor 74 as explained hereinafter. In addition fly wheel 64 is mounted on the shaft 58 to afford overrun of the disc 76, after pin 98 passes through escape slot 79, to the position shown in FIG. 4, just past center.

The cup dispenser 36 is adapted to drop a cup on command through aperture 81 in the platform 20 to the arm 22 on which is mounted flexible holder 83 to hold cup 84 in arcuate retainer 86, the holder being pivoted on post 85 on the arm 22, as shown in FIG. 5, and pressed into cup holding position by spring 87. The holder is normally held in home position by a detent 88 depending from the platform 20 being sufficiently flexible to pass the detent on rotation of the arm. Also mounted on the arm is microswitch 90 which on contact with the spring pressed end of the holder 83 serves to cut off the automatic operation of the device. This cut off is a safety feature to prevent operation of the automatic dispensing device in the event no cup is in position to receive drink ingredients. Secured to the free end of the arm 22 is a tooth 92 adapted to be engaged by pawl 94 mounted on the inside wall of the casing serving to position the arm underneath the cup dispenser and prevent its retreating therefrom, by flexible holder 83 against detent 88, after an operative cycle. Adjacent the holder 83 on the arm 22 is disposed a flexible member 96 adapted to engage micro switch 97 fixed to base 16 which conjoin to stop the driving elements of the device after each cycle, as seen in FIGS. 4 and 5.

On actuation of the motor 24 the arm 22 starts to revolve until the disc 76 strikes the bottom end 98 of piston 100 FIG. 6, which is housed in cylinder 102 on the platform being urged to the top thereof by spring 104 extending between the top of the piston and that of its housing. While the piston is normally in up position it may be selectively lowered through the platform and into the path of the arm disc 76 by means of solenoid 106 to which the piston is connected through a slot in the housing by means of horizontal arm 108. The means for selectively energizing the solenoid is explained hereinafter. Suffice it to say here that the solenoid and piston combination is stationed at each drink ingredient station as shown in FIG. 3, and the solenoids are selectively energized by the buttons 18 according to the mixed drink desired and whether ice and fruit in the drink is wanted.

Also stationed on the platform proximate each solenoid is a pusher element 50 and 50a adapted to dispense one of the selected ingredients. As shown in FIG. 4 the pusher 50a is adapted to bear against switch 110, to actuate release mechanism, to drop a cup in position on the arm 22 through aperture 81 in the platform, as seen in dot dash position. The cup dispenser is standard in construction but preferably should have a capacity to retain and dispense a large number of cups without having to refill.

At the succeeding station there is mounted over the fixed platform 20 the ice container 39, FIG. 7, with its open neck in down position and in communication with an aperture in cylinder 112. A spring pressed plunger which is provided with a central hole 113 receives the ice from the container 39 and on actuation of the pusher 50 conveys the ice, preferably shaved, to aperture 114 in the cylinder through which the ice may drop into the cup after passing through aperture 81 in the platform 20.

The pushers 50 are interchangeable and may be curved, as 50a, to get around cups or necks of bottles as seen in FIGS. 3 and 4, or straight, as 50 to operate pistons as in FIG. 7.

The flavored powder jar 40 in reverse position, FIG. 10, is placed over an opening in another cylinder 116 within which is a spring biased piston 118 having a reduced intermediate section. A pusher element 50 radially aligned with the piston 118 is adapted to slide the piston 118 to release a measured quantity of powder through aperture 120 in the cylinder and through aperture 81 in the platform 20 to the cup supported on the rotatable arm 22.

As shown in FIG. 11 there may be supported on the platform an olive jar 42 which is in communication with cylinder 122 within which there is disposed a spring backed plunger 124 adapted to be acted on by the pusher 50 slidably mounted on the platform 20. The plunger is operated by the pusher 50 to convey a single olive contained in an aperture to a hole 126 from which it will drop into the cup. A weight 128 is placed atop the olives in the jar to assure that there will always be one of them contained in the aperture within the plunger until it is dropped into the cup. It is expected that the other fruit jars would dispense their content in a similar manner.

The wine and liquor bottles are all emptied of their content in measured amounts in substantially the same fashion. There is shown FIG. 12 one expedient for accomplishing this end. The bottle is corked and turned upside down and a tube 130 in inserted through the cork.

The tube is hollow and communicates at its bottom and with a plastic sleeve 132 which has centered openings at top and bottom. Within the sleeve is disposed a rotatable barrel 133 having openings 90 degrees apart and adapted to communicate with the openings in the sleeve. An actuator 134 secured to the barrel and extending radially outwardly is acted on by the pusher 50a to rotate the barrel and discharge its liquid content through the bottom opening of the sleeve and into the cup. The barrel is urged by spring 136 to its normal position when one of its openings is in registry with the top opening of the sleeve.

A signal is provided when a bottle is virtually empty and should be replaced. To this end a switch 138 is mounted on the inner end of the cork as at 147. A thin membrane 140 is attached to rigid base 147 in a water tight manner, and embraces a flotable cork 142 to which there is attached on its under surface a contact 144 which is adapted to engage contact 146 on base 147. When there is insufficient liquid to float the cork the user is informed that the bottle is nearly empty to turning on signal light 149 as shown in FIG. 12.

One of the selector buttons is shown in FIG. 2. As shown the button housing includes a solenoid 140 which on energization as a consequence of the spring back member 142 being manually depressed serves to hold the member in on position. The undersurface of the member 142 is provided with a contact surface adapted to engage contacts to make the solenoid holding circuit in the button and also the various motor circuits required to operate during a cycle of operation.

The schematic wiring diagram shown in FIG. 15 is used to explain the operation of the automatic drink mixing apparatus. On depressing the cap 142 of button 18 which is selected if the user has chosen to mix a martini cocktail the contacts of switches 144, 146, 148, 150 and 152 are closed. The closing of switch 144 connects the solenoid 140 and lamp 154 across the line $L_1$, $L_2$ by means of conductor 156, overload coil 158, conductor 160, time delay switch 162 at the start of operation and conductor 164. As a consequence the button stays depressed and the lamp is illuminated. The closing of switch 146 places the holding circuit coil 166 across the line by means of conductor 168, overload switch 170, conductor 171, time delay switch 172, conductor 174 in series connection on one side of the coil 166 and conductor 176 and the conductor 164 on the other side thereof. As a result motor switch 180 is closed which connects line conductor 182 to commutator 184 on the shaft 30 by lead 186. The commutator 184 is connected to the commutator 188 by means of the cup switch 90 and lead 190. The arm drive motor 24 is connected to the commutator 188 by means of lead 191 and to the output commutator 192 by lead 194, the former being connected to the other side of the line by line conductor 196. The cam drive motor 74 is connectable to the lead 190 by means of the microswitch 82 and to the output commutator 192 by the lead 194. The microswitch 82 is closed by the retraction of the disc 76 thereagainst on being contacted by the solenoid driven piston end 98 and is opened again after a revolution of the disc due to the piston end passing through the escape slot 79 permitting the disc to assume its normal position.

The closing of the button switches 148, 150 and 152 energizes the solenoids 106 located at the gin, vermouth and olive stations, respectively, whereby the cam mounted on the arm will be activated successively at these stations to dispense the ingredients into the cup.

After the arm has started to rotate, the switch 97 will close and the time delay switches will open. Thereafter the continued energization of the button solenoid 140 controlling the switches 144–152 is dependent entirely on the state of the switch 97 which will be opened to cut off the motor circuits at the end of each cycle. Due to the time delay action of coil 158 switch 162 opens so that the switch 97 is in sole control of the operating cycle. On the opening of switch 172 the holding coil 166 will remain energized to the closing of switch 200. Accordingly, the motor switch 180 will remain closed as long as the button solenoid is energized. As mentioned above the motor circuits will be opened by the switch 90 in the event no cup is in position to receive the ingredients.

The switch 170 is normally closed. However, if two or more buttons are pushed simultaneously the overloading of coil 158 will cause the switch to open to cut out the holding circuit coil 166 and open the switch 180 and, hence, the circuits for the drive motors 24 and 74. In this manner, abuse of the apparatus by the operator will result in the stopping of the automatic cycling.

Various modifications of the invention may be effected by persons skilled in the art without departing from the scope and principle of the invention as defined in the appended claims.

What is claimed is:

1. In a drink dispensing apparatus, a stationary platform, a rotatable arm mounted proximate said platform, means for rotating said arm, a motor mounted on the arm, a cam and disc on the arm mounted on a shaft driven by said motor, said disc being retractable on said shaft, a microswitch engageable with said disc and in control of said motor, solenoid operated pistons supported on the platform and adapted to be placed in the path of said disc, selective means for actuating said pistons, said disc having an escape slot formed in its outer periphery and movable dispenser elements on the platform, said cam being adapted to engage said elements.

2. In a drink dispensing apparatus as defined in claim 1 wherein said means for rotating the arm include a main motor and slip clutch.

3. In a drink dispensing apparatus, a stationary platform, a rotatable arm mounted proximate said platform, means for rotating said arm, a motor mounted on the arm, a cam and disc on the arm mounted on a shaft driven by said motor, said disc being retractable on said shaft, a microswitch engageable with said disc and in control of said motor, solenoid operated pistons supported on the platform and adapted to be placed in the path of said disc, selective means for actuating said pistons, said disc having an escape slot formed in its outer periphery and movable dispenser elements on the platform, said cam being adapted to engage said elements, said means for rotating said arm include a main motor slip clutch, there being supported on the platform ingredient containers and dispensers therefor operable by said dispenser elements.

4. In a drink dispensing apparatus as defined in claim 2 wherein there is disposed on said platform an automatic cup dispenser.

5. In a drink dispensing apparatus as defined in claim 4 wherein said cup dispenser includes a main motor cut-off switch controlled by the disposition of a cup in position on the arm to receive drink ingredients.

6. In a drink dispensing apparatus as defined in claim 2 wherein there is provided means to cut off said motors in the event the operator of the selector means attempts to overload a control circuit for said motors.

7. In a drink dispensing apparatus as defined in claim 2 wherein means are mounted on said shaft for affording overrun to said motor.

References Cited

UNITED STATES PATENTS

| 1,938,416 | 12/1933 | Cook | 141—174 |
| 2,685,393 | 8/1954 | Thompson | 141—103 |
| 2,814,317 | 11/1957 | Gale | 141—103 |

FOREIGN PATENTS

| 1,135,692 | 8/1962 | Germany. |

LAVERNE D. GEIGER, *Primary Examiner.*

H. S. BELL, *Assistant Examiner.*